US011418701B2

(12) United States Patent
Citerin et al.

(10) Patent No.: US 11,418,701 B2
(45) Date of Patent: Aug. 16, 2022

(54) METHOD AND SYSTEM FOR AUTO-SETTING VIDEO CONTENT ANALYSIS MODULES

(71) Applicant: CANON KABUSHIKI KAISHA, Tokyo (JP)

(72) Inventors: Johann Citerin, Tregueux (FR); Gérald Kergourlay, Chevaigne (FR); Falk Tannhauser, Rennes (FR); Pierre Visa, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/795,310

(22) Filed: Feb. 19, 2020

(65) Prior Publication Data

US 2020/0275016 A1 Aug. 27, 2020

(30) Foreign Application Priority Data

Feb. 25, 2019 (GB) ...................................... 1902523

(51) Int. Cl.
*H04N 5/232* (2006.01)
*H04N 7/18* (2006.01)

(52) U.S. Cl.
CPC ..... *H04N 5/23216* (2013.01); *H04N 5/23218* (2018.08); *H04N 7/18* (2013.01)

(58) Field of Classification Search
CPC ... H04N 5/23216; H04N 5/23218; H04N 7/18
USPC ........................................................ 348/143
See application file for complete search history.

(56) References Cited

U.S. PATENT DOCUMENTS

| | | | |
|---|---|---|---|
| 9,912,861 B1 | 3/2018 | Solh et al. | |
| 2007/0285537 A1* | 12/2007 | Dwinell | G06T 7/001 348/263 |
| 2011/0110572 A1 | 5/2011 | Guehring et al. | |
| 2012/0133774 A1* | 5/2012 | Sarhan | G08B 13/19656 348/159 |
| 2018/0032819 A1* | 2/2018 | Citerin | G06K 9/00771 |

* cited by examiner

*Primary Examiner* — Joseph G Ustaris
*Assistant Examiner* — Matthew David Kim
(74) *Attorney, Agent, or Firm* — Canon U.S.A., Inc. IP Division

(57) ABSTRACT

At least one embodiment of a method of auto-setting a video content analysis module configured to analyse representation of predetermined targets in images of a scene captured by a video-camera, the method comprising:
obtaining a quality indicator of images captured by the video-camera, the quality indicator being determined as a function of the video content analysis module;
obtaining characteristics of representations of the predetermined targets in images of the scene captured by the video-camera; and
for each setting of a set of settings of the video content analysis module,
estimating a performance indicator of the video content analysis module according to the considered setting, the performance indicator being determined as a function of at least the obtained quality indicator and the obtained characteristics;
based on the estimated performance indicators, selecting a setting for the video content analysis module; and
setting the video content analysis module according to the selected setting.

21 Claims, 6 Drawing Sheets

METHOD AND SYSTEM FOR AUTO-SETTING VIDEO CONTENT ANALYSIS MODULES

This application claims the benefit under 35 U.S.C. § 119(a)-(d) of United Kingdom Patent Application No. 1902523.8, filed on Feb. 25, 2019 and entitled "method and system for auto-setting video content analysis modules". The above cited patent application is incorporated herein by reference in its entirety.

FIELD OF THE INVENTION

The present invention relates to the technical field of auto-setting in video surveillance systems and to a method and a system for auto-setting video content analysis modules such as video content analysis software modules.

BACKGROUND OF THE INVENTION

Video surveillance is currently a fast-growing market tending to become increasingly widespread for ubiquitous applications. It can be used today in numerous areas such as crime prevention, private and public areas for security purposes, abnormal event detection, traffic monitoring, customer behaviour, or general data gathering.

Despite widespread use, video surveillance systems have strong inherent limitations that lead to poor performance, especially for solving crimes and offenses, due to the way it is used. Usually, video surveillance systems aim at streaming video-camera footage to be recorded as well as to be displayed in real-time for monitoring by human operators. Unfortunately, only a very limited fraction of the images can be seen in real-time by the operators, the remaining images of footage recordings being used afterward during batch or forensic activities. However, it has been observed that such forensic activities based on recorded images is rarely used, both because it is often too late and of no use at this point, and also because the task for retrieving and tracking people such as offenders across images from several different video-cameras is time-consuming.

To cope with such limitations, video content analysis (VCA) modules, in particular software video content analysis modules, have been developed to perform some automatic video analysis tasks, both to trigger alarms and to make video surveillance far more real-time responsive, as well as to facilitate the subsequent exploitation of recorded footage, for forensic activities or batch analysis tasks.

Such video content analysis modules fulfil quite diverse tasks. They can be embedded in video-cameras or implemented in servers. They can perform simple tasks such as alarm triggering through a virtual fence (trip-wire), or event-triggered recording through motion detection. Due to resource limitations in video-cameras (in particular in terms of computing power, also known as CPU power (Central Processing Unit power)), the more complicated tasks are generally performed in servers. Such complex tasks comprise, for example, human search, tracking and re-identification, 3D position estimation, advanced counting, facial recognition, license plate recognition (LPR), gender and age detection, and abnormal behaviour detection.

A commercial issue of the video content analysis modules is directed to their performance that are correct only if image conditions (e.g. video settings and video-camera orientation) and VCA settings (e.g. the number of images to be analysed per period of time) are adapted to the scene and to the video content analysis module considered. It has been observed that most customers are not able to carry out the installation themselves because of the fine-tuning that is required. Accordingly, the installation is to be made by specialized installers to make sure the settings are correct.

Since there are few specialized installers, their service increases cost and delay for system deployment. Moreover, settings should be updated regularly to cope with video-camera and scene changes, which is quite difficult and expensive to do when a specialized installer is needed.

Accordingly, VCA deployment ease and cost would benefit from a more automatic process, which would make it possible for non-specialists or specialists of video management systems (VMS) to install video content analysis modules, e.g. by customer staff themselves. Below, this automatic process used for the setup of stream parameters and/or of VCA parameters, required to get optimal results from the video content analysis modules, is called "auto-setting". it is a very difficult task. It may be assimilated as a set of parameter values determined automatically, making it possible for a video content analysis module to be adapted to process images of a particular scene, using particular hardware.

Auto-setting of a video content analysis module is required because the video-camera image features may be very different from one particular scene to another. For example, a scene where many different cars are moving very fast in front of the video-camera in a well-lit scene is completely different from a scene where one car moves slowly, with an orientation not in front of the video-camera, with shadows, etc. As a consequence, the settings of the video content analysis module with regards to the image quality, such as tolerance and detection thresholds, should be chosen appropriately.

Similarly, resource requirements for a video content analysis module, in particular in terms of CPU and of memory, depend on the tasks to be performed by the video content analysis module, on the image characteristics, and on the available resources, which are thus really difficult to determine in advance. For example, a face recognition video content analysis module used to process images of a scene with many faces at the same time, running on a CPU resource-limited server, does not have the same setting in terms of the number of images to be analysed per period of time as compared with a situation where there are few faces per image and the hardware is a fast-running processor.

However, since there does not exist a proper way to determine a particular environment (e.g. a scene environment, target characteristics, and a hardware environment for executing a particular video content analysis module) there is no proper way to automatically determine settings.

Consequently, there is a need for improving auto-setting of a video surveillance system, in particular for dynamically determining the settings of video content analysis modules, without disrupting the system while it is running.

SUMMARY OF THE INVENTION

The present invention has been devised to address one or more of the foregoing concerns.

In this context, there is provided a solution for auto-setting video content analysis modules, for example video content analysis algorithms in video surveillance systems.

According to a first aspect of the invention, there is provided a method of auto-setting a video content analysis module configured to analyse representation of predetermined targets in images of a scene captured by a video-camera, the method comprising:

obtaining a quality indicator of images captured by the video-camera, the quality indicator being determined as a function of the video content analysis module;

obtaining characteristics of representations of the predetermined targets in images of the scene captured by the video-camera; and for each setting of a set of settings of the video content analysis module, estimating a performance indicator of the video content analysis module according to the considered setting, the performance indicator being determined as a function of at least the obtained quality indicator and the obtained characteristics;

based on the estimated performance indicators, selecting a setting for the video content analysis module; and setting the video content analysis module according to the selected setting.

According to the method of the invention, selecting parameter values of a video content analysis module is rapid, efficient and minimally-invasive for the module (Le. the module does not freeze during the auto-setting and remains operational). This makes it possible to trigger auto-setting of a video content analysis module dynamically, for example as a function of changes in the environment.

Optional features of the invention are further defined in the dependent appended claims.

According to a second aspect of the invention, there is provided a device for auto-setting a video content analysis module configured to analyse representation of predetermined targets in images of a scene captured by a video-camera, the device comprising a microprocessor configured for carrying out the steps of:

obtaining a quality indicator of images captured by the video-camera, the quality indicator being determined as a function of the video content analysis module;

obtaining characteristics of representations of the predetermined targets in images of the scene captured by the video-camera; and for each setting of a set of settings of the video content analysis module, estimating a performance indicator of the video content analysis module according to the considered setting, the performance indicator being determined as a function of at least the obtained quality indicator and the obtained characteristics;

based on the estimated performance indicators, selecting a setting for the video content analysis module; and setting the video content analysis module according to the selected setting.

The second aspect of the present invention has optional features and advantages similar to the first above-mentioned aspect.

At least parts of the methods according to the invention may be computer-implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium, Since the present invention can be implemented in software, the present invention can be embodied as computer readable code for provision to a programmable apparatus on any suitable carder medium. A tangible carder medium may comprise a storage medium such as a floppy disk, a CD-ROM, a hard disk drive, a magnetic tape device or a solid state memory device and the like. A transient carder medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

According to embodiments, settings of video content analysis modules are defined automatically by classifying scenes and determining resource needs during learning, calibration, and operation steps. Still according to embodiments, an auto-setting is based on learning an accurate scene model during a learning step, and calibrating such model and exploring available hardware during a calibration step. This makes it possible to get a dynamic auto-setting during an operation step.

For the sake of illustration, the following examples are based on a video content analysis module used for face recognition, with resource constraints such as CPU constraints. In such a case, at least two setting parameters of the video content analysis module should be determined during the auto-setting, namely the number of images to be analysed by the video content analysis module per period of time (which is different from the frame rate of a video stream since not all the images of the video stream should be systematically analysed) and an identification score threshold to be exceeded for a face to be identified (Le. if the identification score is below this threshold, the face is considered as unknown).

It has been observed that the number of images analysed per period of time is of importance because if too few images are analysed, some targets may be missed, which leads to a drop in the accuracy of the video content analysis module. Conversely, analysing too many images leads to wasting resources. Regarding the threshold, if it is too low, many false detections may occur, leading to a drop in the accuracy of the video content analysis module, and if is too high, many targets may be missed, also leading to a drop in the accuracy of the video content analysis module.

However, while the described examples are based on face recognition, for the sake of illustration, it is to be noted that the invention may be implemented for other types of video content analysis modules and for other types of resource constraints. For example, the video content analysis modules can be directed to licence plate recognition, age/gender classification, people counting, abnormal events recognition, and car speed detection. Other examples of resource constraints are memory storage and bandwidth, considered alone or in combination.

Figure 1:
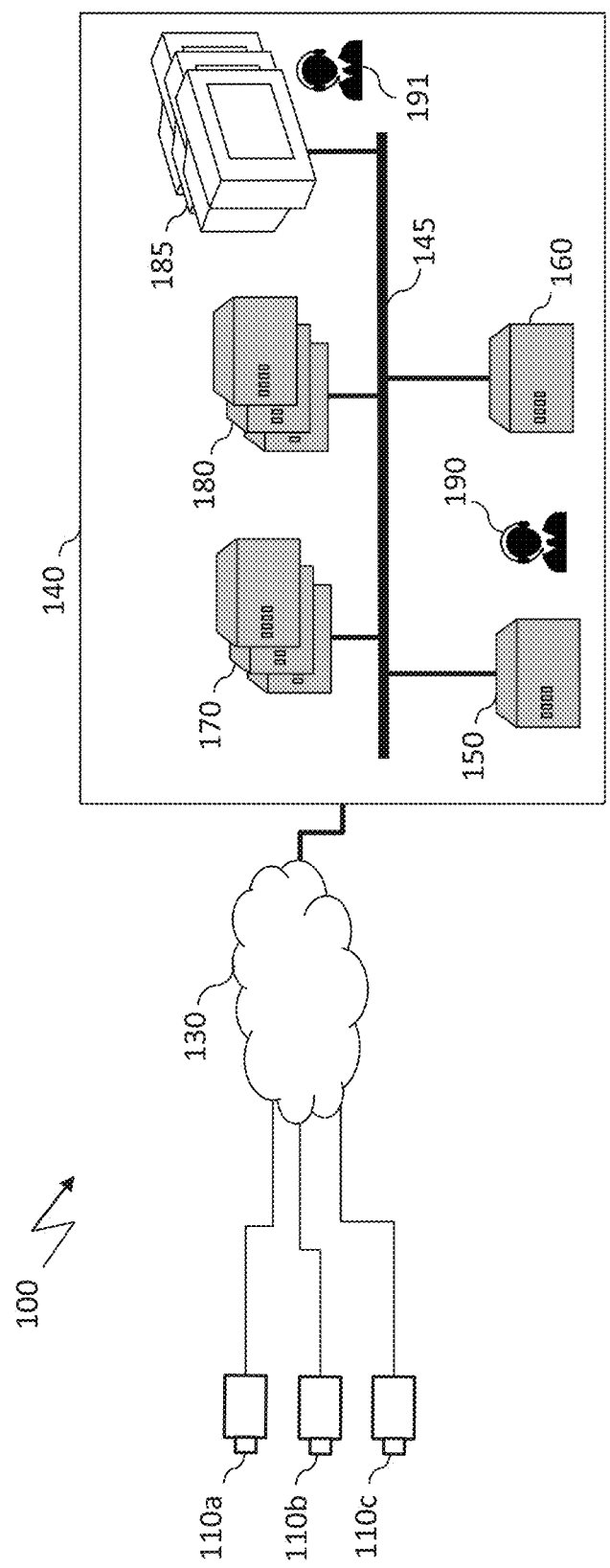
FIG. 1 schematically illustrates an example of a video surveillance system wherein embodiments of the invention may be implemented.

FIG. 1 schematically illustrates an example of a video surveillance system wherein embodiments of the invention may be implemented.

Video surveillance system 100 includes a plurality of network video-cameras denoted 110a, 110b, and 110c, for example network video-cameras of the Internet Protocol (IP) type, generically referred to as IP cameras 110.

Network video-cameras 110, also referred to as source devices, are connected to a central site 140 via a backbone network 130. In a large video surveillance system, backbone network 130 is typically a wide area network (WAN) such as the Internet.

According to the illustrated example, central site 140 comprises a video manager system (VMS) 150 used to manage the video surveillance system, an auto-setting server 160 used to perform an automatic setting of VCA modules, and a set of recording servers 170 configured to store the received video streams, a set of video content analysis module servers 180 configured to analyse the received video streams, and a set of displays 185 configured to display received video streams. All the modules are interconnected via a dedicated infrastructure network 145 that is typically a local area network (LAN), for example a local area network based on Gigabit Ethernet.

Video manager system 150 may be a device containing a software module that makes it possible to configure, control, and manage the video surveillance system, for example via an administration interface. Such tasks are typically carried out by an administrator (e.g. administrator 190) who is in charge of configuring the overall video surveillance system. in particular, administrator 190 may use video manager system 150 to select a source encoder configuration for each source device of the video surveillance system. In the state of the art, this is the only way to configure the source video encoders.

The set of displays 185 may be used by operators (e.g. operators 191) to watch the video streams corresponding to the scenes shot by the video-cameras of the video surveillance system.

The auto-setting server 160 contains a module for automatically or almost automatically setting parameters of video content analysis modules that may be implemented in video-cameras or in the servers 180. The auto-setting server 160 is described in more detail by reference to FIG. 2.

Administrator 190 may use the administration interface of video manager system 150 to set input parameters of the auto-setting algorithm described with reference to FIGS. 3 to 9, carried out in auto-setting server 160 (it being noted that according to embodiments, the auto-setting may be carried out in a video-camera embedding a video content module).

Figure 2:
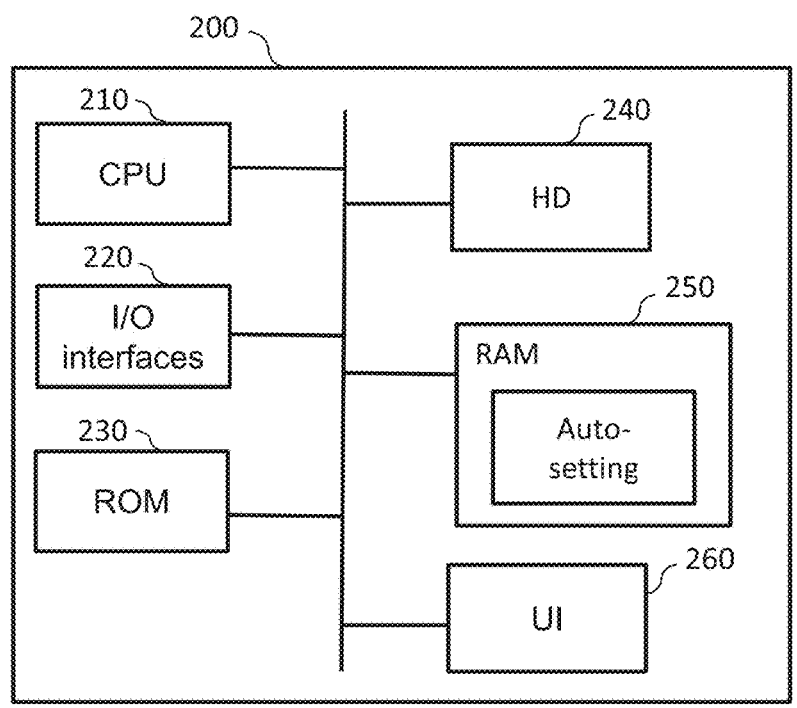
FIG. 2 is a schematic block diagram of a computing device for implementing embodiments of the invention.

FIG. 2 is a schematic block diagram of a computing device for implementing embodiments of the invention. It may be embedded in auto-setting server 160 described with reference to FIG. 1.

The computing device 200 comprises a communication bus connected to:

a central processing unit 210, such as a microprocessor, denoted CPU;

an I/O module 220 for receiving data from and sending data to external devices, In particular, it may be used to retrieve images from source devices;

a read only memory 230, denoted ROM, for storing computer programs for implementing embodiments;

a hard disk 240 denoted HD;

a random access memory 250, denoted RAM, for storing the executable code of the method of embodiments of the invention, in particular an auto-setting algorithm, as well as registers adapted to record variables and parameters:

a user interface 260, denoted UI, used to configure input parameters of embodiments of the invention. As mentioned above, an administration user interface may be used by an administrator of the video surveillance system.

The executable code may be stored either in random access memory 250, in hard disk 240, or in a removable digital medium (not represented) such as a disk of a memory card.

The central processing unit 210 is adapted to control and direct the execution of the instructions or portions of software code of the program or programs according to embodiments of the invention, which instructions are stored in one of the aforementioned storage means. After powering on, CPU 210 may execute instructions from main RAM memory 250 relating to a software application after those instructions have been loaded, for example, from the program ROM 230 or hard disk 240.

According to particular embodiments, auto-setting of a video content analysis module is carried out dynamically by using a score function (score(t)) that should be maximized. it may be a predictive model of the effectiveness of the video content analysis module in terms of accuracy and, preferably, of resource consumption, that depend on the settings. Such a function may be expressed as follows:

$$\text{score}(t) = f_{VCA\_accuracy}(\text{variable}(t), VCAsettings) - \sum_i \beta_i(t) f_{resource_i}(\text{variable}(t), VCAsettings)$$

where, variable(t) represents characteristics of the analysed images, having an effect on the video content analysis module, such as a quality value of the analysed images and values characterizing the analysed targets, for example their number, speed and size. These values may vary over time;

VCAsettings represents a set of settings of the video content analysis module, for example a threshold and a number of analysed frames per period of time;

$f_{VCA\_accuracy}$ a function that makes it possible to compute the accuracy of the accuracy is video content analysis module, as a function of one or more parameters, denoted variable(t), and of VCAsettings;

$f_{resource_i}$ is a function that makes it possible to compute the consumption of resource i for the video content analysis module to perform its task, as a function of variable(t) and of VCAsettings. One or several resources may be considered (i.e. index i is an integer equal or greater than 1). According to embodiments, it is directed to at least the use of the CPU; and $\beta_i(t)$ is a weight factor defining a trade-off between the accuracy of the video content analysis module and each of the resources required to reach this accuracy.

Different score functions may be considered provided that the score increases when the accuracy of the video content analysis module increases and that the score decreases when weight factor decreases and/or when resource consumption increases.

Accordingly, the setting of a video content analysis module may be expressed as follows:

$$VCA_{settings} = \mathrm{argmax}_{VCAsettings}(\mathrm{score}(t))$$

When a video content analysis module is used in a video surveillance system, for analysing images to obtain information regarding predetermined targets, the score function may be expressed as follows:

$$\mathrm{score}(t) = f_{VCAaccuracy}(\mathrm{image\_quality}, \mathrm{target\_parameter}, \mathrm{VCA\_parameters}) - \sum_i \beta_i(t) f_{resource_i}(\mathrm{target\_parameters}, \mathrm{VCA\_parameters})$$

it being observed that the target parameters may comprise fixed parameters and dynamic parameters and that VCA parameters may comprise settings of the video content analysis module and uncontrolled parameters of the video content analysis module.

According to embodiments, the image quality parameter gathers the parameters that produce an effect on the quality of the images that are analysed by the video content analysis module. hi other words, the image quality parameter is representative of how "easy" it is for the video content analysis module to analyse an image due to its quality. For the sake of illustration, the image quality parameter may represent the presence of noise and blur as well as the contrast, and/or back light conditions. it may be obtained from a function that is able to determine the image quality parameter directly from the image, that may be built from a (large) dataset of images that include targets to detect under various conditions, for example various levels of noise, of contrast, of blur, and of lighting as well as various encoding conditions. It may also be obtained from a function that is able to calculate the image quality parameter from the values of noise, contrast, back light, and any other relevant artefact-related parameter value. Such artefact parameter values may be obtained from other functions that are able to measure them directly from the images.

Regarding the target parameters, it is to be recalled that each video content analysis module analyses one or more targets, for example cars, people, or buildings, which have properties that depend on the scene and make them more difficult or easier to analyse. The target parameters are parameters related to the targets that produce an effect on the accuracy of the video content analysis module. For the sake of illustration, in most cases, the target size is a variable that plays a roe in the accuracy of the video content analysis module. Similarly, for moving targets, the number of images where the target is visible in the analysed area of the image also plays a role in the accuracy of the video content analysis module, especially in the cases where the latter only needs to make one successful detection, such as face recognition (the greater the number of available images of each target, the greater the chance of making a good detection (but also the greater the chance of making a bad detection).

As mentioned above, the target parameters may comprise fixed parameters and dynamic parameters. The fixed parameters are those which are bound to a scene and do not change much. They can be measured once and for all during a calibration step. They comprise, for example, a mean target size (e.g. the size in pixels) and a mean target visibility duration time (the period of time during which the target is visible in the analysed area, that depends on the size of the target and on the analysed area as well as on the target velocity). By contrast, the dynamic parameters change over time, during use of the video-camera. They need to be measured in real-time. Still for the sake of illustration, the dynamic parameters may comprise the number of targets in the analysed area (even though this has no influence on the VCA accuracy), denoted ntargets.

According to embodiments, the parameters of the video content analysis module (VCA parameters) depend on the type of the video content analysis module. They preferably include all the parameters that play a role in the VCA accuracy and comprise VCA settings and VCA uncontrolled parameters. As described above and according to embodiments, the VCA settings comprises a threshold and a number of frames to be analysed per period of time, for example a number of frames per second, denoted fps. More generally, they may comprise all the VCA parameters that may be set by a user and that may have effects on the accuracy of the video content analysis module. The uncontrolled parameters are those that cannot be directly set but that play a role regarding the accuracy of the video content analysis module. Examples of uncontrolled parameters are the size of the reference database used for recognizing/identifying targets (for example the number of different persons that may be recognised, denoted nid_album, and the mean number of images for each person, denoted nim_album_per_id), the natural diversity of targets in a given area, and the complexity of country-bound specificities. For example, reading license plates in the United-States of America is more complex that in other countries due to the colourful plates with reduced contrast. Similarly, using a license plate recognition system for recognizing licence plates that may belong to any one of 10 countries is more difficult than using a license plate recognition system for recognizing licence plates that may belong to only one country, due to more possibilities of errors.

Figure 3:
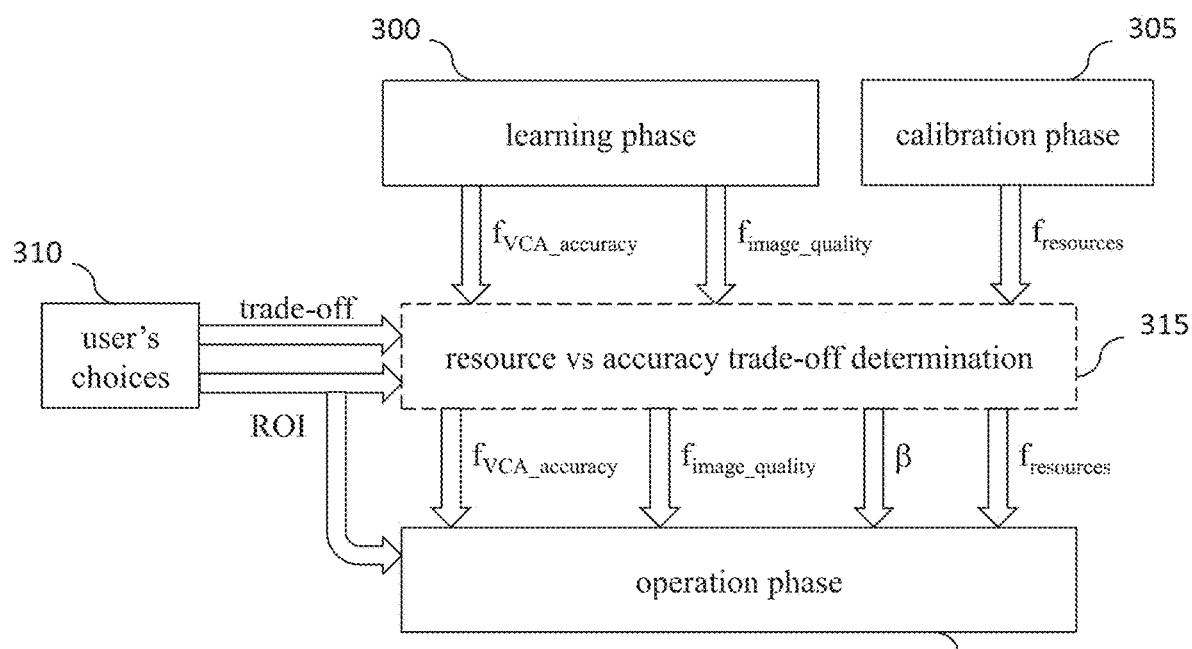
FIG. 3 is a block diagram illustrating an example of an auto-setting method enabling automatic setting of parameters of a video content analysis module according to embodiments of the invention.

FIG. 3 is a block diagram illustrating an example of an auto-setting method enabling automatic setting of parameters of a video content analysis module according to embodiments of the invention.

As illustrated, the auto-setting method comprises three main phases (learning, calibration, and operation) and an optional step directed to setting a trade-off value between the efficiency of the video content analysis module and the amount of resources that are required.

A first phase is a learning phase (reference 300). According to embodiments, it is performed before the installation of the video content analysis module, for example during the development of a software application used for processing the data received from the video content analysis module. It aims at providing the functions denoted $f_{VCA\_accuracy}$ and $f_{image\_quality}$ that estimate the accuracy of the video content analysis module and the quality of an image, respectively, as a function of parameter values as described above. Each of these functions corresponds to a particular video content analysis module.

The $f_{VCA\_accuracy}$ and $f_{image\_quality}$ functions may be mathematical relations, n-dimensional arrays associating a value with a set of n parameter values, e.g. an image quality value with noise, blur, contrast, and brightness, or a set of values defined during learning and representing the parameters of a model, for example the parameters of a regressor.

A second phase (reference 305) is directed to calibration. It is typically carried out during installation of the video-camera from which the video content analysis module receives images and of the video content analysis module itself. According to embodiments, it aims at measuring target fixed parameters in the scene (e.g. the size of the targets) and at providing the function denoted $f_{resource}$ that estimates the resource used as a function of parameter values depending on the scene and on the available resources.

As illustrated (reference 310), a user may define parameters, in particular a region of interest (ROI) that corresponds to the area to be actually analysed, in the images to be processed by the video content analysis module, so that the results obtained from different areas are ignored.

Moreover, the user may set (directly or indirectly) a parameter referred to as the parameter, that characterizes the trade-off to be made between the accuracy of the video content analysis module and the resources that are used. In order to help the user to set this value and as described by reference to FIG. 9, the system may determine a value for the β parameter after the user has selected a pair comprising an accuracy of the video content analysis module (VCA accuracy) and the corresponding use of resources, in a list of pairs of accuracies of the video content analysis module and of corresponding uses of resources, for which the value of the β parameter is known (reference 315). Such a list may be proposed after the learning phase and the calibration phase have been carded out. Setting the value of the β parameter (by entering a value or by selecting a pair comprising an accuracy of the video content analysis module and the corresponding use of resources) can be done, for example, through a graphical user interface.

A third phase (reference 320) is directed to operation. It is carried out, in particular, during the operational use of the video content analysis module, to improve its setting. It is preferably executed in a very short period of time, for example less than one second, and without perturbation of the video content analysis module, except for changing its settings (i.e. it is a non-invasive phase). It is used to select suitable settings, preferably the most suitable settings, taking into account real-time measurements. This phase is preferably triggered at periodic times, upon request by a user, or upon detection of a particular event. In addition, it can be automatically launched after each analysed frame. According to embodiments, it measures target dynamic parameters and the quality of the images to be analysed and obtains values of VCA uncontrolled parameters in real-time.

The Learning Phase

Figure 4:
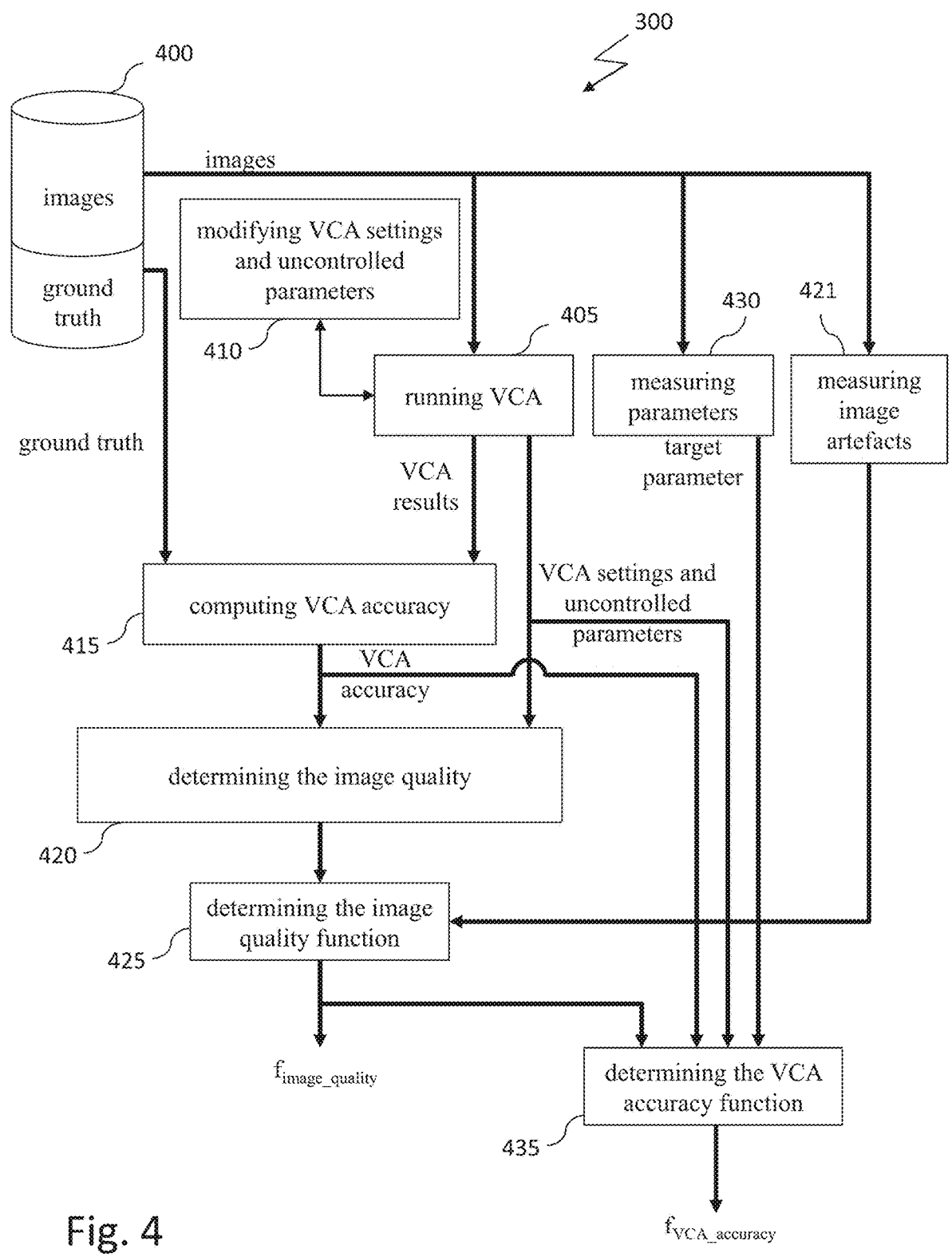
FIG. 4 illustrates an example of a general workflow of the learning phase illustrated in FIG. 3, making it possible to determine an image quality function and a VCA accuracy function from a learning dataset.

FIG. 4 illustrates an example of a general workflow of the learning phase illustrated in FIG. 3, making it possible to determine an image quality function and a VCA accuracy function from a learning dataset.

As described above and according to embodiments, the image quality corresponds to how easy it is for the video content analysis module to achieve good results. Therefore, the image quality may be defined as the maximum accuracy that the video content analysis module may achieve with the best possible choice of settings, and a typical choice of uncontrolled parameters of the video content analysis module.

Accordingly and as illustrated, a first step (step 405) is directed to analysing images of a training dataset (reference 400) comprising images and the corresponding ground truth (that is to say the expected results of the considered video content analysis module assumed to be perfectly set).

During the learning phase, the user has control over the environment of the video content analysis module. Therefore, the uncontrolled parameters of the video content analysis module become controllable. For example, the user may decide to run the video content analysis module with an arbitrary number and choice of faces in the recognition dataset. Likewise, he/she can also decide to use any number of countries for licence plate patterns. By comparing the results of the video content analysis module for a large number of different settings and for different uncontrolled parameters of the video content analysis module (reference 410), and for different image quality levels (by properly choosing the training dataset), the accuracy of the video content analysis module may be computed for different conditions (step 415).

The obtained accuracy of the video content analysis module may be used in conjunction with the settings of the video content analysis module and with the uncontrolled parameters to determine the image quality, for example by calculating the maximum achievable accuracy of the video content analysis module for a typical uncontrolled value (step 420), for each image or video analysed. The images may be analysed to look for artefact values, such as noise, blur, contrast issues, or backlight (step 421), by using deep learning estimation methods, or any other image analysis function. A maximum achievable accuracy of the video content analysis module and the artefact values make it possible to determine the image quality function (step 425), for example by using a regression function.

According to embodiments, the image quality function is determined directly by training from the images and the image quality values, for example based on deep learning. In this case, step 421 is not carried out, and images are directly funnelled into module 425, which determines a direct relationship between image features and a maximum available accuracy of the video content analysis module.

Steps 405 to 425 are described in more detail with reference to FIG. 5.

The accuracy function may be determined similarly.

As illustrated, the training dataset 400 may also be used to obtain the accuracy function. To that end, target parameters of the images of the training dataset are measured (step 430). Such target parameters preferably comprise target fixed parameters (e.g. the mean target size and the mean target visibility duration time) and target dynamic parameters (e.g. the number of targets in the analysed area).

In parallel, before, or after, the quality of the images of the training dataset is computed, for example using the function determined during step 425.

According to embodiments, computing the quality of images is carried out for the whole manifold of possible settings of the video content analysis module and for all uncontrolled parameters so as to compute the corresponding accuracy, making it possible to establish a relation between the accuracy and the image quality, the target fixed parameters, the target dynamic parameters, the settings, and the uncontrolled parameters (step 435). This can be done by using a regressor.

It is to be noted that since the inputs are scalar data (not raw data), deep learning is not necessary, some simpler efficient non-linear machine learning methods such as SVM (support vector machine) or gradient boosting works fine and are easy to train.

Steps 430 and 435 are described in more detail by reference to FIG. 6.

Figure 5:
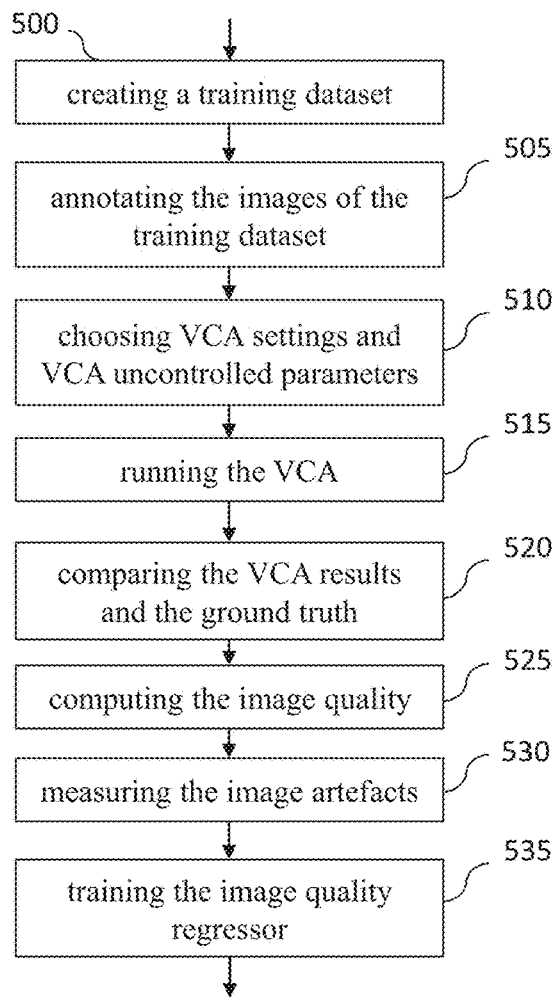
FIG. 5 illustrates an example of steps for determining a function making it possible to determine image quality values.

FIG. 5 illustrates an example of steps for determining a function making it possible to determine image quality values.

As illustrated (step 500), a first step is directed to creating a training dataset. Advantageously, it comprises a large amount of images and/or video chunks representative of the task to be carried out by the video content analysis module, for various video surveillance typical footages, in various image quality conditions.

During creation of the learning dataset or after, each image is preferably annotated (step 505), in particular, to set a ground truth corresponding to the image, for the considered video content analysis module. As described above, the ground truth corresponds to the result expected from the video content analysis module assuming that it is perfectly set. For the sake of illustration, the ground truth may be the identity of people (for face identification) or real plate numbers (for license pate recognition).

Next, the settings to be tested of the video content analysis module are determined as well as a typical uncontrolled parameter of the video content analysis module (step 510). For the sake of illustration, a list of pairs of different thresholds and number of images to be analysed per period of time may be established. Such a list may be bunt by varying the threshold from its minimum value to its maximum value according to a predetermined step and, for each of these values, creating a pair with this value and each value of the number of images to be analysed per period of time, varying from its minimum value to its maximum value according to a predetermined step.

Regarding the typical uncontrolled parameter of the video content analysis module, it may be chosen by a user according to the circumstances. For example, the uncontrolled parameter may be set by selecting, in the training dataset, only images representing vehicles having licence plates conforming to the French format. Selecting only images representing vehicles having licence plates conforming to the French format or to the US format would set the uncontrolled parameter differently.

Next, the video content analysis module is run for each of the different possible settings, each of the different choices of uncontrolled parameters, and for different selected images of the training dataset (step 515). The choice of the images that are processed by the video content analysis module is such as to ensure that the variation of the image quality is distributed along the whole possible manifold.

The results of the video content analysis module are then used to compute its accuracy by comparing these results with the ground truth (step 520). In turn, the accuracy is used to compute the image quality (step 525). According to embodiments, the image quality is determined as being the higher accuracy, for a given processed image, in view of the different tested settings of the video content analysis module:

$$image_{quality} = \max_{VCAsettings} (VCA\_accuracy(VCAsettings))$$

The image artefacts may be measured on the images. Image artefacts include all possible artefacts that decrease image quality, including noise, blur, contrast issues, and backlight (step 530).

The image quality values and the image artefacts values may then be used to train an image quality regression model (step 535).

Another mean to obtain the image quality consists in training directly a regression neural network through deep learning, directly on the images of the dataset, by using the image quality values as the objective function. In that case, step 530 is not carded out, images and image quality values are provided to step 535 directly.

As a result, the $f_{image\_quality}$ function is obtained, taking an image as input and providing an image quality as output. According to embodiments (in the case according to which step 421 is carded out), this function is the combination of the measurement of the image artefacts, and the subsequent regression model that uses those artefact values as input. According to other embodiments (in the case according to which step 421 is not carded out), this function is the neural network itself that has been trained to provide an image quality estimation based on the image alone. For the sake of illustration, the neural network may be a convolutional neural network, for example a neural network of the ResNet type.

Figure 6:
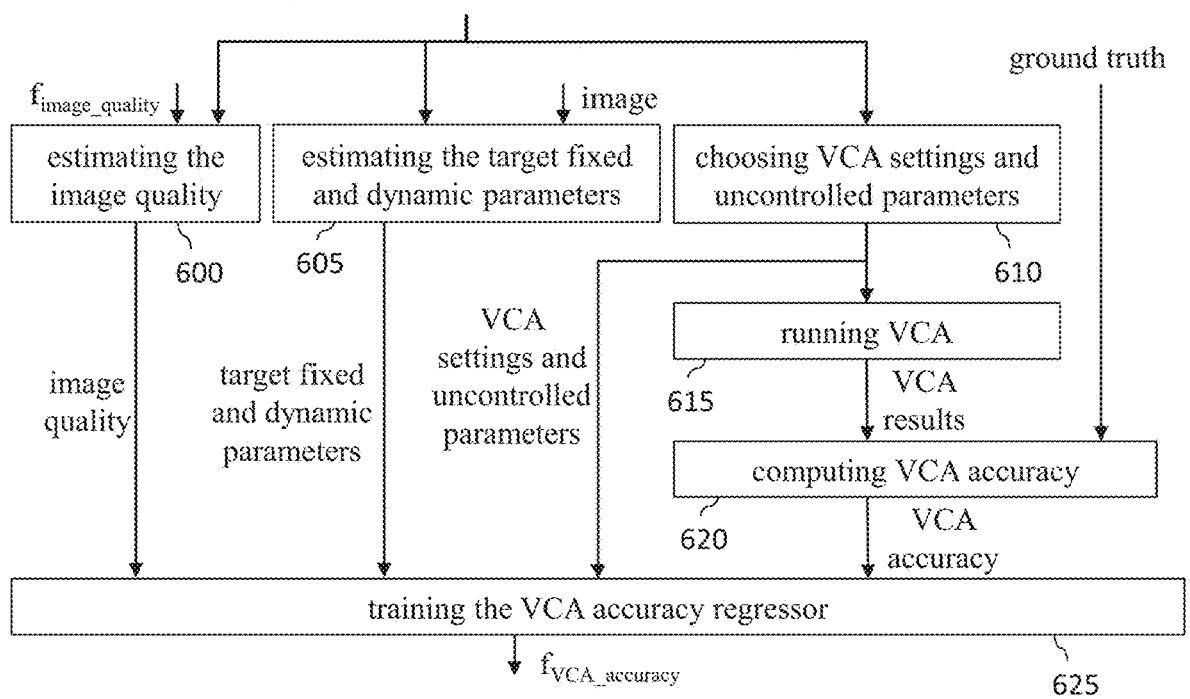
FIG. 6 illustrates an example of steps for determining a function making it possible to determine the accuracy of a video content analysis module.

FIG. 6 illustrates an example of steps for determining a function making it possible to determine the accuracy of a video content analysis module.

According to the illustrated example, a first step is directed to the estimation of the quality of each image of the training dataset used for determining a function making it possible to determine the accuracy of a video content analysis module (step 600). This may be done by using a relation such as the one obtained from the steps disclosed with reference to FIG. 5, for example by using all the images of the training dataset that have been used to determine this relation.

In parallel, before, or after, the target fixed parameters and the target dynamic parameters are measured in the images of the training dataset that are used (step 605).

Likewise, in parallel, before, or after, the settings to be tested of the video content analysis module are determined, as well as multiple sets of uncontrolled parameters of the video content analysis module to be tested as well (step 610). Contrary to step 510 described by reference to FIG. 5, multiple choices of uncontrolled parameters are done, chosen among the different possible values that may be used during the expected operation. Not all may be possibly tested, but a subsample distributed along the manifold may be uniformly selected.

Next, the video content analysis module is run for each of the different possible settings and for different selected images of the training dataset (step 615). Again, the choice of the images that are processed by the video content analysis module is such as to ensure that the variation of the image quality is distributed among the whole manifold of possible values.

The results of the video content analysis module are then used to compute its accuracy by comparing these results with the ground truth (step 620).

In turn, the accuracy is used to train an accuracy regressor through nonlinear machine learning (step 625). Training is based on the image quality, the target dynamic and fixed parameters, the VCA uncontrolled parameters, and the VCA settings.

As a result, the $f_{VCA\_accuracy}$ function is obtained. This takes multi-input values (image quality, target dynamic and fixed parameters, VCA uncontrolled parameters, VCA settings) and provides a score (VCA accuracy) as output. According to the given example, this function is the machine learning regressor itself that has been trained on the training dataset.

The Calibration Phase

As described above, an aspect of the calibration phase is to analyse the actual scene and the available resources so as to adapt the video content analysis module to the actual conditions.

According to embodiments, the calibration phase is carried out to measure the target fixed parameters and to determine (or learn) the $f_{resource}$ function that makes it possible to estimate the resource used as a function of parameter values depending on the scene and on the available resources. It may be carried out using chunks representative of the scene captured by the video-camera considered.

Figure 7:
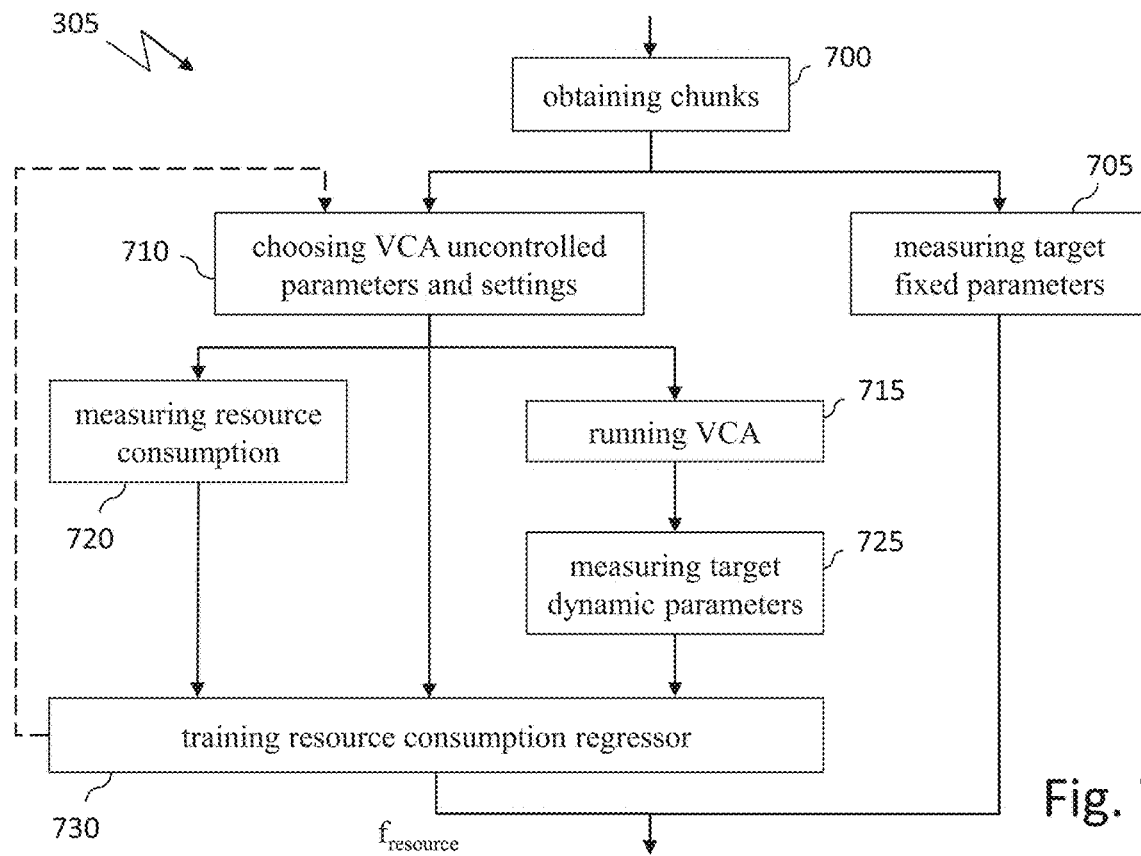
FIG. 7 illustrates an example of steps of the calibration phase illustrated in FIG. 3, making it possible to determine a resource consumption function from a learning dataset.

FIG. 7 illustrates an example of steps of the calibration phase illustrated in FIG. 3, making it possible to determine a resource consumption function from a learning dataset.

As illustrated, a first step is directed to obtaining chunks (step 700). The chunks may be obtained in real-time from the considered video-camera and/or from storage, for example from a video storage server. They may be extracted automatically from a video sequence, for example according to detected events, and/or by a user.

Next, after having obtained chunks, target fixed parameters are measured (step 705).

According to embodiments, this is done by directly analysing the video issued from the considered video-camera using a dedicated video content analysis module. Since all targets are different from each other, only a statistically significant value is needed. Accordingly, the dedicated video content analysis module may make mistakes without significant impact (as long as the mean value remains correct). Accordingly, the user can use the video content analysis module that settings are to be determined, in most cases, to derive most of the target fixed parameters, such as the target size and/or the target velocity.

In parallel, before, or after, the resource consumption function is determined.

This can be done according to a method similar to the one described above for determining the VCA accuracy function (it being noted that as no raw data is used, there is no need for deep learning, and standard machine learning can be used efficiently). One difference lies in the fact that the chunks cannot or can with difficultly be annotated and thus, a video content analysis module is used.

According to embodiments, a first step for determining the resource consumption function is directed to choosing the VCA settings to be tested and the VCA uncontrolled parameters to be tested (step 710). According to embodiments, the chosen VCA settings are the same as those chosen for the training phase (as described by reference 510 in FIG. 5). According to other embodiments, the chosen VCA settings and uncontrolled parameters are only a subsample of those chosen for the training phase, in order to reduce the duration of the calibration phase.

Next, the video content analysis module is run (step 715), preferably for each of the chunks and for each value of the chosen settings (step 715), while monitoring the resource consumption at the same time (step 720).

Using the results of the video content analysis module, the target dynamic parameters of each chunk (or each image of the chunks) are measured (step 725).

Next, a resource consumption regression function is determined for each of the resources (step 730). This can be done by using nonlinear machine learning trained with parameters comprising the resource consumption and the target dynamic parameters, the VCA uncontrolled parameters, and the VCA settings. This makes it possible to obtain a resource consumption estimator for each of the resources.

According to embodiments, the image quality may also be considered as a relevant parameter to estimate the resource consumption function.

As a result, a resource consumption function ($f_{resource}$) is obtained, taking multiple values as input (e.g. target dynamic parameters, VCA uncontrolled parameters, and VCA settings) and providing a resource consumption estimation as output. Such a function is the machine learning regressor itself, that has been trained on the dataset.

Operation Phase (or Auto-Setting Operation Phase)

The operation phase may be triggered by a user or automatically, for example when a specific event is detected, so as to update the settings in order to optimize the video content analysis module, in particular its accuracy. The operation phase may also be triggered periodically or when the value of the β parameter is to be modified.

Figure 8:
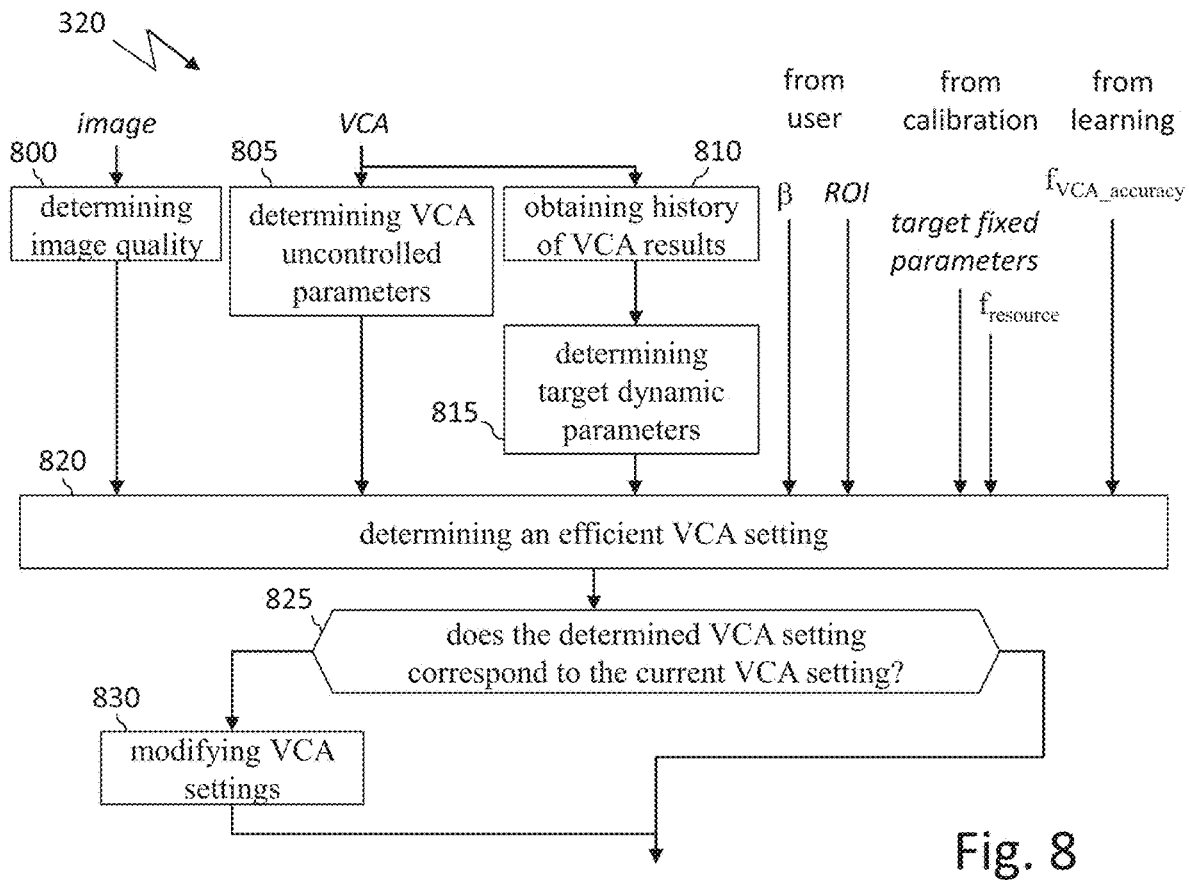
FIG. 8 illustrates an example of steps of the operation phase illustrated in FIG. 3, making it possible to determine efficient settings of the video content analysis module.

FIG. 8 illustrates an example of steps of the operation phase illustrated in FIG. 3, making it possible to determine efficient settings of the video content analysis module.

As illustrated, a first step is directed to determining the quality of an image (step 800) and determining the VCA uncontrolled parameters (step 805). The image quality may be obtained from an analysis of the current image or from a collection of captured images of the scene (this evaluation could be periodic, for instance every 10 minutes, or may be done every time the video-camera settings are to be updated or upon a request from a user).

In parallel, before, or after, the history of the VCA results is obtained (step 810) since in almost every case, the history of the VCA results makes it possible to estimate the target dynamic parameters (step 815). For example, the current number of targets can be estimated from the few last VCA analyses, in case targets take time to disappear from the camera point of view, and in case the number of targets visible has an inertia of at least several seconds.

Next, using the VCA accuracy function and the resource consumption function, an efficient setting, preferably the most efficient setting, may be determined by computing scores for several possible VCA settings (denoted VCAsettings(j)) and selecting the VCA setting corresponding to the maximum score (step 820):

$$VCAsettings = \text{argmax}_{VCAsettings}(\text{score}(t, j))$$

with $$\text{score}(t, j) = f_{VCAaccuracy}(\text{image\_quality}(t),$$

$$\text{target\_fixed\_parameter, target\_dynamic\_parameters}(t, j),$$

-continued $$VCA\_uncontrolled\_parameters(t), VCAsettings(j)) -$$

$$\sum_i \beta_i f_{resource_i}(\text{target\_dynamic\_parameters}(t, j),$$

$$VCA\_uncontrolled\_parameters(t), VCAsettings(j))$$

According to embodiments, a score is computed for each of the setting as defined, for example, by reference to step 510 in FIG. 5.

Next, after having determined the VCA setting corresponding to the maximum score, the determined VCA setting is compared with the current VCA setting (step 825). if the determined VCA setting is different from the current VCA setting, the setting of the video content analysis module is set to the determined VCA setting (step 830).

Choosing a Trade-Off Between VCA Accuracy and Resource Consumption

As described above, a parameter representing a trade-off between a VCA accuracy and resource consumption, denoted $\beta$, is to be set when resource consumption is to be considered for setting the video content analysis module. According to embodiments, it is determined as a function of a pair of VCA accuracy and resource consumption values selected by a user in a list of pairs of VCA accuracy and resource consumption values. Such a list may be determined by computing the VCA accuracy and resource consumption values for each value of a predetermined list of $\beta$ values.

Figure 9:
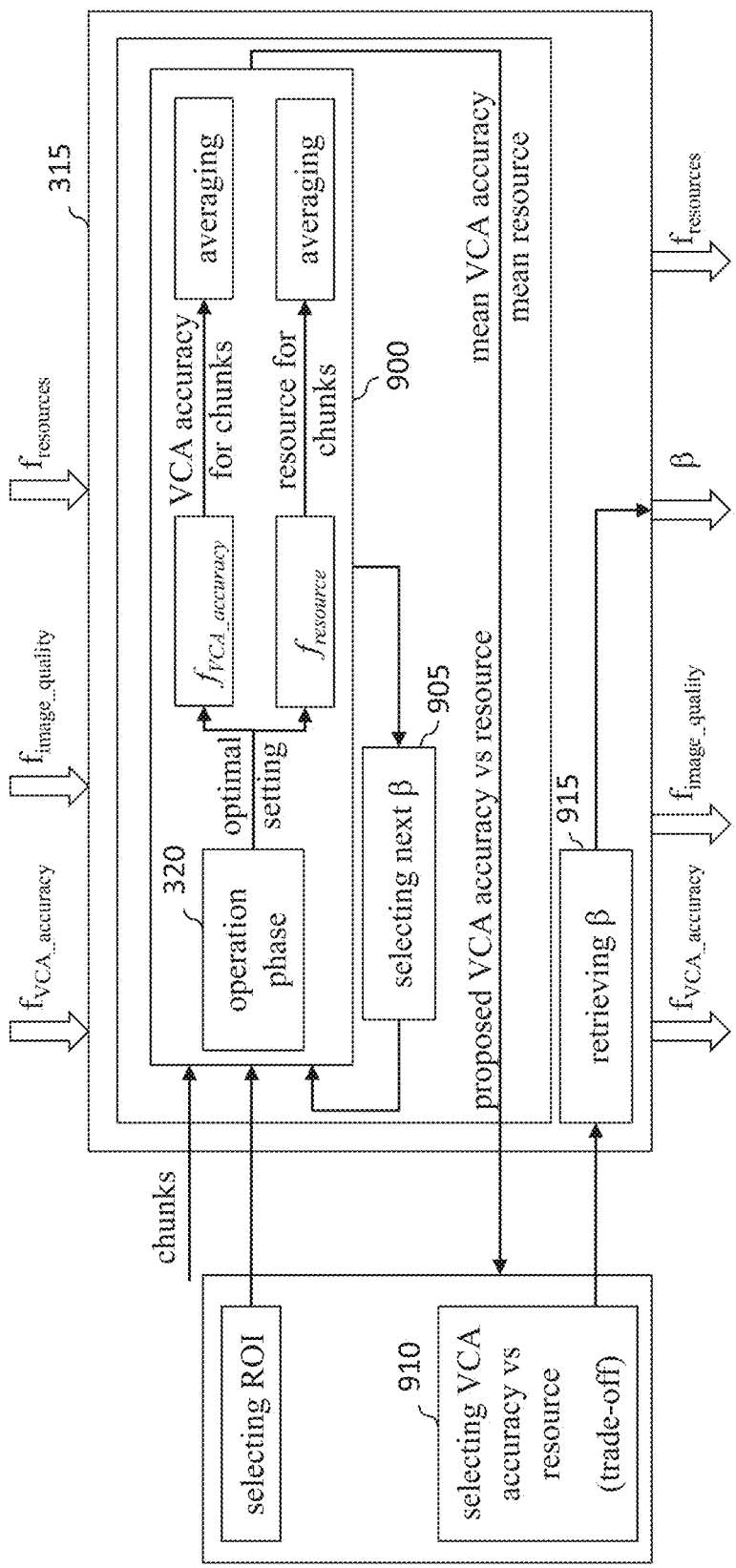
FIG. 9 illustrates an example of an interface making it possible for a user to set a trade-off between VCA accuracy and resource consumption.

FIG. 9 illustrates an example of an interface making it possible for a user to set a trade-off between VCA accuracy and resource consumption.

After having determined a list of $\beta$ values, for example by determining a minimum value (e.g. 0), a maximum value (e.g. 2), and a step (e.g. 0.05), after having determined the resource consumption function ($f_{resource}$), the VCA accuracy function ($f_{VCA\_accuracy}$), and the image quality function ($f_{image\_quality}$), for example as described above, and after a user has defined a region of interest, if a region of interest is to be used, a first value of the $\beta$ parameter is selected and the optimal VCA setting for this value is determined. This may be obtained according to the operation step described by reference to FIG. 8 and a set of chunks, for example the chunks used to carry out the calibration phase.

Using such an optimal VCA setting, the mean VCA accuracy and the mean resource consumption are computed, for example using the VCA accuracy function, the resource consumption function, and each chunk of the set of chunks (step 900), for the considered value.

Then, if any, the next $\beta$ value is selected (step 905), and the mean VCA accuracy and the mean resource consumption are computed after having determined the optimal setting corresponding to this $\beta$ value.

Next, after having computed a mean VCA accuracy and a mean resource consumption for each $\beta$ values, a list of pairs of VCA accuracy and resource consumption values are presented to a user so that it may choose the one corresponding to his/her needs (step 910).

Next, the $\beta$ value corresponding to the pair of VCA accuracy and resource consumption values is retrieved (step 915).

Since the resource consumption function ($f_{resource}$) and the VCA accuracy function ($f_{VCA\_accuracy}$) are used, according to the example described by reference to FIG. 9, the $\beta$ value is to be set after these functions have been determined.

It is noted that there exist cases wherein consumption of resources is not considered as a relevant factor. In such a case, determination of an efficient setting is made without considering use of resources that is to say, in particular, without determining a resource consumption function and without setting a trade-off parameter regarding the accuracy of the video content analysis module and the resource consumption.

While the invention has been illustrated and described in detail in the drawings and foregoing description, such illustration and description are to be considered illustrative or exemplary and not restrictive, the invention being not restricted to the disclosed embodiment. Other variations on the disclosed embodiment can be understood and performed by those skilled in the art, in carrying out the claimed invention, from a study of the drawings, the disclosure and the appended claims.

Such variations may derive, in particular, from combining embodiments as set forth in the summary of the invention and/or in the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method of auto-setting a video content analysis module configured to analyse representation of predetermined targets in images of a scene captured by a video-camera, the method comprising:
    obtaining a quality indicator of images captured by the video-camera, the quality indicator being representative of an accuracy that the video content analysis module may achieve and being determined from parameters of the images, independently of items of information directed to targets represented in the images, using a quality estimator model, the quality estimator model being set during a learning phase as a function of the video content analysis module, taking into account different environment conditions, the learning phase being performed before the video content analysis module is installed;
    obtaining characteristics of representations of the predetermined targets in images of the scene captured by the video-camera; and
    for each setting of a set of settings of the video content analysis module,
    estimating a performance indicator of the video content analysis module according to the considered setting, the performance indicator being determined as a function of at least the obtained quality indicator and the obtained characteristics;
    based on the estimated performance indicators, selecting a setting for the video content analysis module; and
    setting the video content analysis module according to the selected setting.

2. The method of claim 1, wherein the video content analysis module is set according to the selected setting in response to determining whether or not the selected setting is different from the actual setting of the video content analysis module.

3. The method of claim 1, wherein the characteristics of representations of the predetermined targets in images comprise fixed parameters and dynamic parameters, the fixed parameters being determined in a calibration phase of the video content analysis module.

4. The method of claim 1, further comprising determining the quality indicator, the quality indicator being determined from the quality estimator model set during the learning phase, as a function of results obtained from the video content analysis module and of images captured by the video-camera.

5. The method of claim 1, wherein the performance indicators are estimated from a model of the video content analysis module, the model of the video content analysis module being set during a learning phase, as a function of at least results obtained from the video content analysis module, quality indicators of images captured by the video-camera, and characteristics of representations of the predetermined targets in images of the scene captured by the video-camera.

6. The method of claim 1, wherein the performance indicators further depend on resource consumption.

7. The method of claim 6, wherein the performance indicators are a trade-off between the accuracy of the video content analysis module and the resources required by video content analysis module, for a given setting of the video content analysis module.

8. The method of claim 7, wherein the trade-off is determined as a function of selecting a pair in a list comprising a plurality of pairs of an accuracy of the video content analysis module and an amount of resources required by video content analysis module.

9. The method of claim 1, further comprising defining a region of interest in images obtained from the video-camera, the characteristics of representations of the predetermined targets being obtained from the defined region of interest.

10. The method of claim 1, wherein estimating a performance indicator of the video content analysis module, selecting a setting for the video content analysis module, and setting the video content analysis module according to the selected setting are carried out periodically, upon detection of a predetermined event, or upon request from a user.

11. The method of claim 1, wherein a performance indicator of the video content analysis module is further determined as a function of an uncontrolled parameter of the video content analysis module.

12. A non-transitory computer readable storage medium storing a program to cause a computer to execute the method according to claim 1.

13. The method of claim 1, wherein the quality indicator is representative of a maximum accuracy that the video content analysis module may achieve with a best possible choice of settings.

14. A device for auto-setting a video content analysis module configured to analyse representation of predetermined targets in images of a scene captured by a video-camera, the device comprising a microprocessor configured for carrying out the steps of:
  obtaining a quality indicator of images captured by the video-camera, the quality indicator being representative of an accuracy that the video content analysis module may achieve and being determined from parameters of the images, independently of items of information directed to targets represented in the images, using a quality estimator model, the quality estimator model being set during a learning phase as a function of the video content analysis module, taking into account different environment conditions, the learning phase being performed before the video content analysis module is installed;
  obtaining characteristics of representations of the predetermined targets in images of the scene captured by the video-camera; and
  for each setting of a set of settings of the video content analysis module,
  estimating a performance indicator of the video content analysis module according to the considered setting, the performance indicator being determined as a function of at least the obtained quality indicator and the obtained characteristics;
  based on the estimated performance indicators, selecting a setting for the video content analysis module; and
  setting the video content analysis module according to the selected setting.

15. The device of claim 14, wherein the microprocessor is further configured so that the video content analysis module is set according to the selected setting in response to determining whether or not the selected setting is different from the actual setting of the video content analysis module.

16. The device of claim 14, wherein the microprocessor is further configured for carrying out a step of determining the quality indicator, the quality indicator being determined from the quality estimator model set during the learning phase, as a function of results obtained from the video content analysis module and of images captured by the video-camera.

17. The device of claim 14, wherein the microprocessor is further configured so that the performance indicators are estimated from a model of the video content analysis module, the model of the video content analysis module being set during a learning phase, as a function of at least results obtained from the video content analysis module, quality indicators of images captured by the video-camera, and characteristics of representations of the predetermined targets in images of the scene captured by the video-camera.

18. The device of claim 14, wherein the performance indicators further depend on resource consumption, wherein the performance indicators are a trade-off between the accuracy of the video content analysis module and the resources required by video content analysis module, for a given setting of the video content analysis module, and wherein the trade-off is determined as a function of selecting a pair in a list comprising a plurality of pairs of an accuracy of the video content analysis module and an amount of resources required by video content analysis module.

19. The device of claim 14, wherein the microprocessor is further configured for carrying out a step of defining a region of interest in images obtained from the video-camera, the characteristics of representations of the predetermined targets being obtained from the defined region of interest.

20. The device of claim 14, wherein the microprocessor is further configured so that estimating a performance indicator of the video content analysis module, selecting a setting for the video content analysis module, and setting the video content analysis module according to the selected setting are carried out periodically, upon detection of a predetermined event, or upon request from a user.

21. The device of claim 14, wherein the quality indicator is representative of a maximum accuracy that the video content analysis module may achieve with a best possible choice of settings.

* * * * *